April 2, 1935.   R. E. FISHER   1,996,287
PIPE COUPLING
Filed May 12, 1933
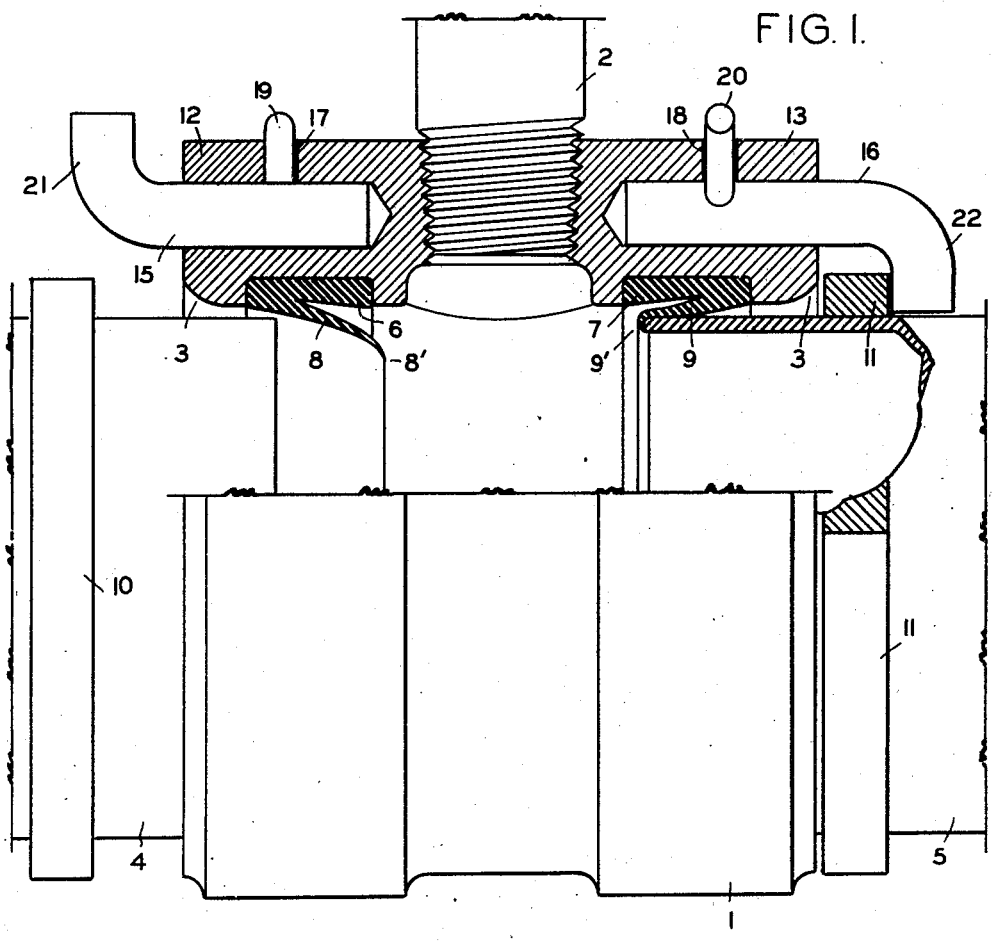
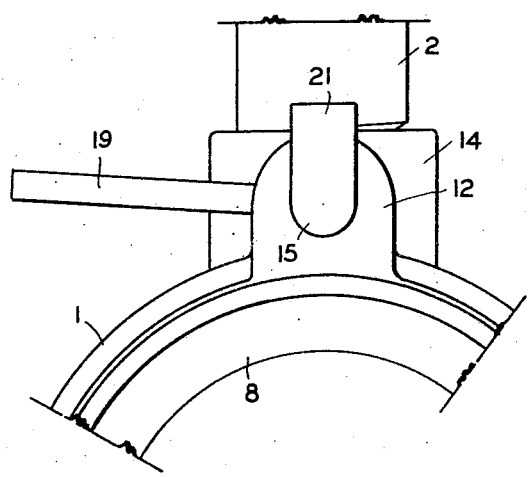
INVENTOR:
RICHARD E. FISHER,
BY Baldwin Sale
ATTORNEY.

Patented Apr. 2, 1935

1,996,287

UNITED STATES PATENT OFFICE 1,996,287

PIPE COUPLING

Richard E. Fisher, San Francisco, Calif.

Application May 12, 1933, Serial No. 670,722

2 Claims. (Cl. 285—193)

This invention relates to improvements in pipe couplings and more particularly to removable couplings for sectional irrigation systems.

One object of the invention is to provide pressure tight couplings for detachably connecting adjoining pipe ends.

Another object is to provide means for positively locking the pipe ends in the coupling to prevent longitudinal separation of the pipe section.

Other objects and advantages will appear as the description progresses.

In this specification and the accompanying drawing, the invention is disclosed in its preferred form. It is to be understood, however, that it is not limited to this form because it may be embodied in other forms within the spirit of the invention as defined in the claims following the description.

In the one sheet of drawings:

Fig. 1 is a side elevation partly in vertical section of a pipe coupling constructed in accordance with this invention showing one pipe end locked in the operative position.

Fig. 2 is a fragmentary detail in end elevation of the same showing the locking means in the inoperative position.

In detail, the construction illustrated in the drawing referring to Fig. 1, comprises the tubular sleeve 1, having the outlet stand pipe 2, threaded therein. The opposite ends of the coupling are beveled at 3—3 to facilitate the entrance of the ends of the pipes 4 and 5.

Adjacent the ends 3—3, the sleeve has internal annular grooves to receive the packing rings 6 and 7 embedded therein flush with the internal bore of the sleeve. These rings are preferably composed of compounded rubber reinforced with canvas fabric vulcanized therein. The flexible and elastic lips 8 and 9 form an integral part of the rings 6 and 7 and taper to thin edges and a reduced diameter at 8' and 9', less than the diameter of the pipe ends 4 and 5.

The pipe ends 4 and 5 are each provided with the collars 10 and 11, respectively, which abut the ends 3—3 of the sleeve and limit the extension of these ends into the coupling. The pipe ends are thus stopped short of the edges 8' and 9' of the lips 8 and 9 respectively.

The lugs 12 and 13 are formed in alinement with the spud 14 integral with the sleeve of the coupling. These lugs are drilled in alinement with the axis of the pipe sections to receive the stems 15 and 16 oscillatable therein. The lugs are slotted transversely at 17 and 18 to receive the pins 19 and 20, respectively fixed transversely in the stems 15 and 16.

The ends of these stems are bent at an angle to form the latches 21 and 22 which are thrown into and out of engagement with the collars 10 and 11 by the pins 19 and 20 respectively.

The pipes 4 and 5 are relatively light gage casing of convenient portable lengths having the ends slightly beveled to facilitate their entrance into the coupling and to prevent injury to the packing lips 8 and 9. The pipe ends are pushed into the coupling until stopped by the collars 10 and 11. The pins 19 and 20 are then swung laterally from the position shown in Fig. 2 to the position shown to the right in Fig. 1. This positively locks the latch heads 21 and 22 behind the collars 10 and 11 respectively, and prevents withdrawal of the pipe ends from the coupling.

When hydrostatic pressure is applied to the sectional pipe line, it curls the elastic lip edges 8' and 9' around their respective pipe ends, see Fig. 1, which prevents leakage at these points, yet allows a limited degree of angular freedom to permit the pipe line to adjust itself to the gradients of the ground upon which it is supported.

When the pressure is introduced, the pipe line tends to elongate which is prevented by the latches 21 and 22.

In overhead irrigation, rotary distributer heads, not shown, are mounted upon the stand pipes 2 to distribute water over the desired area; after which the pipe line is disjointed and moved to another area.

The stems 15 and 16 could be threaded into the lugs 12 and 13 and the heads 21 and 22 rotated by a wrench instead of the pin and slot engagement shown, without departing from the spirit of the invention.

Having thus described this invention, what is claimed and desired to secure by Letters Patent is:

1. A pipe coupling including a sleeve having a lug thereon with a hole therein parallel to the axis of said sleeve and a segmental slot transverse to the axis of said hole; a latch pivoted in said hole and adapted to engage a pipe extending into said sleeve and a pin in said latch engaging in said slot and limited in its swing thereby.

2. A pipe coupling including a sleeve having a lug thereon with a hole therein parallel to the axis of said sleeve and a slot intersecting and transverse to the axis of said hole; a pipe end extending into said sleeve and having a collar thereon; a latch pivoted in said hole and having a bent end adapted to engage over said collar; and a pin in said latch extending through said slot and limited in its swing thereby.

RICHARD E. FISHER.